Nov. 29, 1932.  R. COVER  1,889,057
MACHINE FOR CUTTING GRAIN KERNELS FROM AN EAR
OF CORN AND THE CUTTING BLADES THEREFOR
Filed Aug. 5, 1929   3 Sheets-Sheet 2
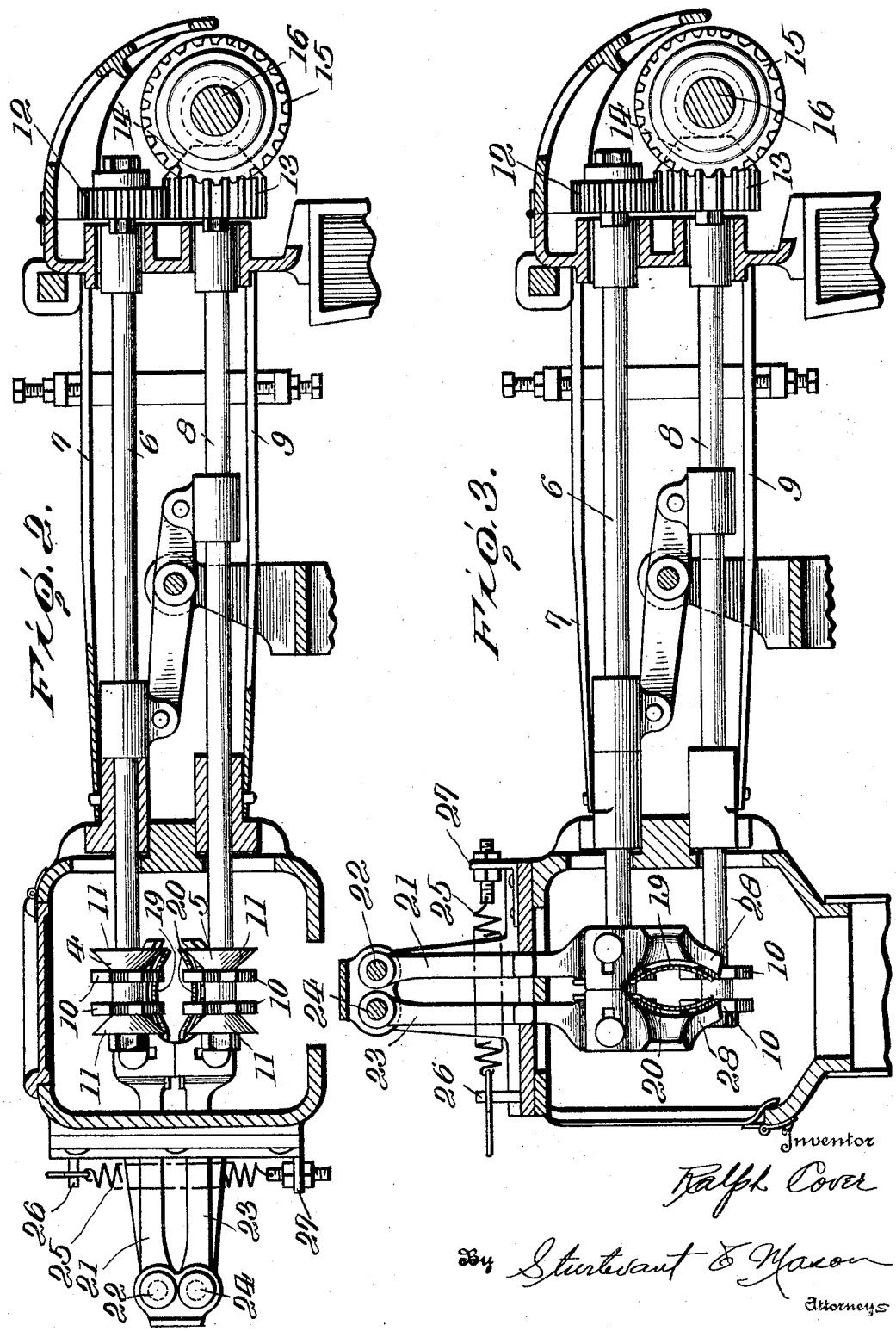
Inventor
Ralph Cover
By Sturtevant & Mason
Attorneys

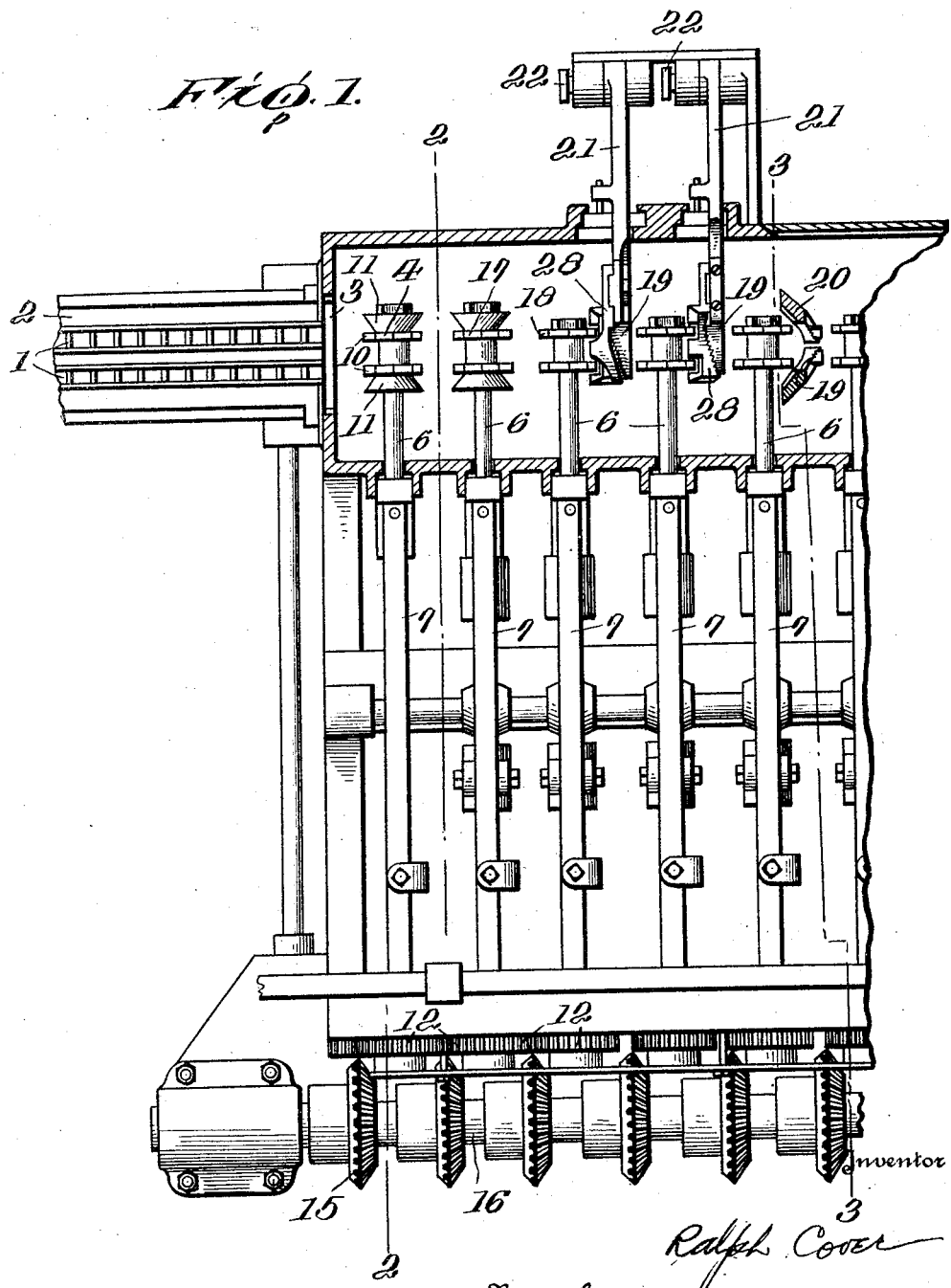

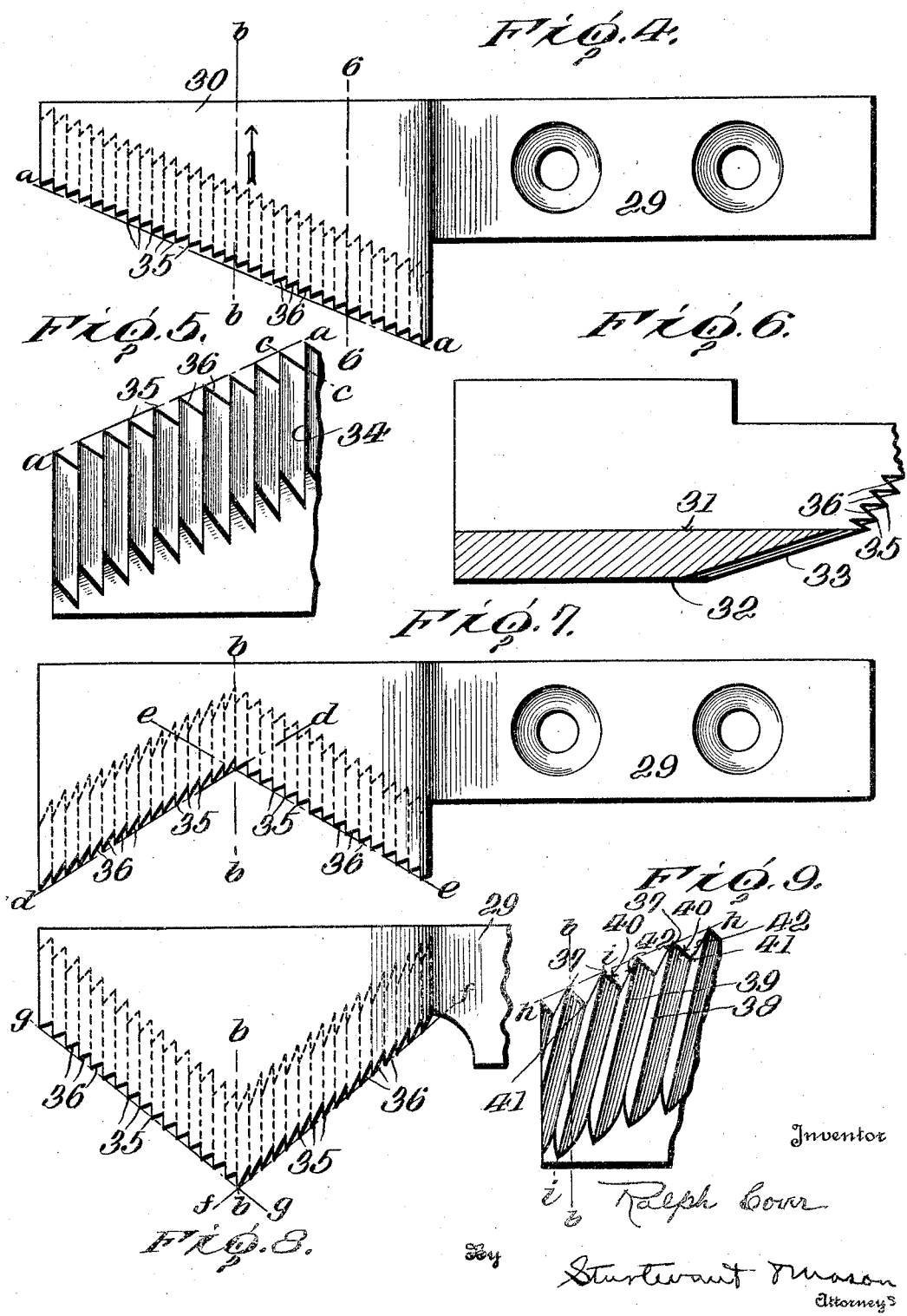

Patented Nov. 29, 1932

1,889,057

UNITED STATES PATENT OFFICE

RALPH COVER, OF BALTIMORE, MARYLAND

MACHINE FOR CUTTING GRAIN KERNELS FROM AN EAR OF CORN AND THE CUTTING BLADES THEREFOR

Application filed August 5, 1929. Serial No. 383,723.

The invention relates to new and useful improvements in a machine for cutting the grain kernels from an ear of corn, and more particularly to the cutting blades therefor.

An object of the invention is to provide a machine of the above type wherein the cutting blade is provided with means for first piercing and then cutting each grain kernel.

A further object of the invention is to provide a machine of the above character wherein the piercing points are disposed in a line oblique with the line of movement of the ear as it is presented to the cutting blade.

A further object of the invention is to provide a machine of the above type wherein the oblique cutting edge of the cutting blade is provided with piercing points so that each kernel is first pierced and then cut.

A further object of the invention is to provide a machine of the above type wherein the piercing points are disposed in a line oblique to the line of feed of the ear, and the cutting edges are in lines parallel with each other and oblique to the line containing the piercing points.

A further object of the invention is to provide a machine of the above type wherein the cutting blades are provided with beveled cutting faces, and each cutting face is formed with piercing points, and cutting edges disposed between the piercing points, and wherein the beveled face is provided with grooves disposed between the piercing points to form the cutting edges.

A still further object of the invention is to provide a machine of the above type wherein the cutting blades are provided with piercing points, and each blade is so shaped that the wear on the blade incident to the ear passing across the same tends to sharpen the piercing points and cutting edges.

These and other objects will in part be obvious and will in part be hereinafter more fully described.

In the drawings:

Figure 1 is a plan view of a portion of the machine embodying the improvements.

Fig. 2 is a sectional view on the line 2—2 of Fig. 1 showing one of the cutting units, the parts in rear thereof being omitted for sake of clearness.

Fig. 3 is a sectional view on the line 3—3 of Fig. 1 showing another cutting unit and the feed rolls which positively move the ears through the cutting units.

Fig. 4 is a plan view of a cutting blade embodying the improvements.

Fig. 5 is a portion of the outer face of said blade and the under face is shown in Fig. 2.

Fig. 6 is a sectional view on the line 6—6 of Fig. 4.

Fig. 7 is a view similar to Fig. 4 but showing a slightly modified form of the arrangement of the cutting edge of the blade.

Figure 8 is a view similar to Fig. 7 but showing a still further modified form of the arrangement of the cutting edge of the blade.

Fig. 9 is a detail view similar to Fig. 5 but showing a slightly modified arrangement of the grooves, and also the cutting edges associated with the piercing points.

The invention is directed broadly to a machine for cutting grain kernels from an ear of corn. It is a common expedient to feed an ear of corn in a lengthwise direction across cutting blades for the purpose of severing the grain kernels from the ear, Patent No. 1,215,563, granted to John C. McIntyre on February 13, 1917, is an instance of a machine of this type. The machine includes a series of cutting units, each of which is provided with supporting devices for the cutting blades, mounted so that the blades may shift laterally of the line of feed so as to accommodate ears of different diameters. The units are so placed that the blades of one unit operate upon the ear in one region, while the blades of another unit operate upon the ear in a different region. Thus it is that by passing of the ear, through the aid of a suitable mechanism, across the cutting blades substantially all the kernels are severed therefrom. The present invention has particularly to do with a machine of this type wherein the ears are forcibly fed in a lengthwise direction across the cutting blades.

The invention resides in the particular construction of cutting devices. Each cutting blade is provided with a series of piercing points, and a cutting edge, which are so disposed that a piercing point first penetrates the kernel and the cutting edge then severs the kernel. These piercing points in the preferred form of the invention are disposed in a line oblique to the line of feed, and the cutting edges are also in lines parallel with each other, and likewise oblique to the line containing the piercing points. Thus it is that the side thrust of the ear due to the oblique disposition of the cutting edge of the blade causes the kernels to contact with the cutting edges, and this greatly increases the efficiency of the cutting action. The cutting blade is beveled on the face thereof farther from the ear as it passes over the blade. This beveling of the advanced face of the blade produces a cutting edge. The cutting edge is, as stated, in a line oblique to the line of feed of the ear. The blade on the face thereof which is beveled is provided with a series of grooves which are closely spaced and extend to the cutting edge. These grooves are so shaped as to form in the cutting edge piercing points with cutting edges extending from one piercing point toward the next adjacent piercing point.

These grooves form ribs, and the face of the rib leading to the cutting edge between the piercing points is inclined so as to produce a sharp cutting edge extending rearwardly from each piercing point to the base of the projection forming the cutting edge. As the face of the cutting blade adjacent the ear wears away due to the passing of the ears over the same, the piercing points and cutting edges merely recede from their initial position, and still maintain their sharp piercing and cutting character. These piercing points are so closely spaced that each kernel is pierced by one or more of the points, and the cutting edge then severs the kernel from the ear.

Referring more in detail to the drawings, the machine embodies a framework, in which is mounted a series of feeding units. The ears from which the kernels are to be severed are fed into the machine by endless conveyors 1, 1 which travel over a supporting trough 2 carried by the frame of the machine. These conveyors feed the ears through an opening 3 to the first feeding unit, which consists of feed rollers 4 and 5. The feed roller 4 is carried by a shaft 6, which is mounted in bearings which permit a slight rising and falling movement of the feed roller 4, and a spring 7 normally forces the roller downwardly. The feed roller 5 is carried by a shaft 8, which is similarly mounted in bearings for rising and falling movement, and a spring 9 normally moves the roller 5 upwardly and thus the rollers 4 and 5 are yieldingly pressed toward each other. These feed rollers include positively acting feed members 10, 10, and tapered guiding members 11, 11. The feed shaft 6 is provided with a gear 12, and the feed shaft 8 is provided with a gear 13. These gears intermesh. Associated with the gear 13 is a beveled gear 14 which cooperates with a beveled gear 15 on the actuating shaft 16.

The next feeding unit includes feed rollers 17 which are similar in construction to the feed roller in the first described unit. These feed rollers 17 are mounted on shafts which are positively operated in the manner just described.

The third feeding unit includes feed rollers 18. These are similar to the feed rollers of the other units, except that the tapered guiding members are omitted. This feeding unit feeds an ear to the first cutting unit. The first cutting unit includes cutting blades 19 and 20. The blade 19 is carried by an arm 21 which is pivoted at 22. The blade 20 is carried by an arm 23 which is pivoted at 24. These arms 21 and 23 are yieldingly forced toward each other by means of a spring 25. This spring engages a pin 26 carried by a slide bearing against one of the arms, and it also engages a bracket 27 carried by another slide which bears against the other arm. The spring is detachably attached to the bracket 27 so that the tension of the spring may be varied. The arm 21 besides carrying the blade 19 carries a guard 28. The guard 28 is provided with suitable cut-away parts so as to permit the feed wheel to forcibly feed the ear over the guard into engagement with the cutting blade 19.

As shown in Figure 1 of the drawings there is a second cutting unit, which is similar in construction to the one just described, and it is disposed so as to operate in the same region upon the ear. Where two cutting units are used one may be set for deeper cutting than the other. These two units, as stated, are similar in construction, and the same reference numerals have been applied thereto.

These cutting units may be defined as the horizontally positioned cutting units as they operate upon the upper and lower regions of the ear. In rear of the two cutting units just described are two cutting units which are vertically disposed, and which are similar in construction. Only a portion of one of these units has been shown, and the same references are applied thereto as were used in connection with the other cutting units. Instead of using a plurality of horizontally disposed cutting units and a plurality of vertically disposed cutting units, other arrangements may be had. In fact, a single cutting unit with the new and improved cutting blade is sufficient for severing the kernels from the ear. The machine will not be described further in detail as the feeding mechanism and the devices for supporting the blades per se form no part of the present invention. These features are all shown and described in detail in Patent No. 1,215,563 referred to above.

The invention is directed particularly to the cutting blade used in a machine of this general type. The cutting blade includes a shank portion 29 carrying the blade 30. The cutting blade 30 is shaped to conform to the average ear, and is thus concave on its upper face as indicated at 31. It is also convex on its lower face 32, and the advanced edge of the cutting blade is beveled as indicated at 33, Fig. 6. This beveling of the blade forms a cutting edge. The beveled face 33 is provided with grooves 34, which form at the cutting edge spaced piercing points 35, 35. As shown in Fig. 4 of the drawings, the cutting edge lies in a line a—a which intersects at an acute angle the center line b—b of the blade. The center line b—b of the blade is really the direction in which the ear is fed across the blade for severing of the kernels, and is therefore the line of feed, the ear passing in the direction of the arrow, Fig. 4, as it is fed to the cutting blade. The piercing points lie in this line a—a, which, as noted, is at an acute angle to the line of feed. The grooves are shaped in the embodiment of the invention shown in Figs. 4 to 8 so that the wall directly in rear of the point 35 extends in a direction radially of the curvature of the blade. The wall of the other face of the groove is inclined and provides a cutting edge 36. The cutting edge extends from the piercing point along a line cutting at an acute angle the line a—a, see Fig. 5. This line of the cutting edge 36 is indicated at c—c. There are of course a plurality of these lines c—c, which are parallel with each other.

This produces a construction wherein the cutting blade is provided with a series of piercing points which are closely spaced. They are in fact so closely spaced that a plurality of these piercing points will engage each kernel. By arranging the piercing points in a line inclined to the line of feed and the cutting edges in a line inclined to the line of feed in a reverse direction, a very efficient cutting action is accomplished. The piercing point first penetrates the kernel and then the cutting edge follows and completes the severing of the kernel. It will be understood that from certain aspects of the invention these cutting edges may be greatly modified, and in fact the piercing points may be made so close together that the kernels are practically ruptured and then severed from the ear by the piercing points alone. I prefer, however, the combined action of the piercing points and the severing cutting edge. Inasmuch as the piercing points and the cutting edges are formed by the grooves in the beveled face of the cutting blade, any wearing away of the face of the blade adjacent the ear will result in a sharpening of the blade, and the blade may be said to be self-sharpening.

In Fig. 7 of the drawings a slightly modified form of the blade is shown in that the blade is shaped so as to provide inclined cutting edges which meet at the center of the blade. The cutting edge at one side of the blade lies in a line center line b—b of the blade, and while the cutting edge at the other d—d, and while the cutting edge at the other side of the center line b—b lies in a line e—e, these lines d—d and e—e intersect at the center line b—b. The blade is beveled and provided with grooves forming piercing points and cutting edges just as described above.

In Fig. 8 of the drawings the blade is shown as having the cutting edge arranged in lines which are inclined and meet so as to provide a V-shaped cutting edge. The cutting edge at one side of the line b—b lies in a line f—f, while the cutting edge at the other side of the line b—b lies in the line g—g. Thus it is that these cutting edges f—f and g—g intersect at the center forming a V-shaped projecting cutting edge. The cutting blade is beveled and provided with grooves forming piercing points and cutting edges as above described.

In Fig. 9 of the drawings a slightly modified form of the invention is shown. The blade is provided with piercing points 37, 37, and these piercing points lie in a line h—h, which is inclined to the line of feed. The blade is beveled on its outer face so as to provide this inclined cutting edge h—h. The beveled face of the blade is provided with grooves which are parallel with each other, but these grooves do not extend in a direction parallel to the center line of the blade. The center line of the blade is indicated at b—b in Fig. 9. The ribs formed by the grooves lie in a line i—i, which is inclined to this line b—b. Furthermore the groove is so cut as to provide a flat face 38, and a flat face 39. These flat faces intersect at the bottom of the groove. The flat face 38 is in a plane at an angle to a plane radial of the curved surface of the blade. Likewise, the face 37 is in a plane at an angle to a radial plane of the blade. As a result there are two cutting edges formed, a cutting edge 40 extending from the piercing point 37 to the point 41 where the faces intersect, and a cutting edge 42 extending also from the piercing point 37 to the point 41 where the faces intersect on the other side of the point. The cutting edge 40 is on one side of the point 37, while the cutting edge 42 is on the other side of the point 37. This produces a pyramid shaped serration, and the cutting edge is formed of a series of pyramid shaped serrations each including a piercing point and cutting edges leading therefrom. The grooves forming the piercing points may be parallel with the line of feed, as indicated in Figs.

4 to 8 inclusive, or inclined to the line of feed, as indicated in Fig. 9. The inclined faces produced by the cutting of the grooves which form the piercing points may be otherwise positioned than described in detail.

The essential feature consists in the providing of a cutting edge with piercing points, and the preferred form of the invention is the beveling of the edge of the blade and grooving the same to produce these piercing points so that the wearing away of the blade will still maintain a sharp piercing point. The shaping of the grooves in cross section may be widely varied from that described in detail. Again the essential feature consists in the producing of piercing points which are closely spaced so that a plurality of piercing points will enter each kernel, and in the preferred form of the invention these grooves are so shaped as to produce cutting edges which lead either on one or both sides rearwardly from the piercing points. Again while in the preferred form of the invention the cutting edge extends substantially from one piercing point to the other so that the entire cutting edge of the blade consists of piercing points and cutting edges, it will be understood that this structure may be modified. As shown in the drawings, the faces of the groove are flat faces resulting in a sharp piercing point. It will be understood in the changing of the shape of the groove these piercing points may be varied as to form. Again the essential feature consists in the advanced cutting portion which is of restricted character so that it will pierce the kernel, and it is not intended that the invention should be limited to a sharp needle-like piercing point.

It is obvious that the cutting blade with its new features may be used in any type of machine, and that the machine illustrated in the drawings is purely for the purpose of making clear the construction and function of the blade which forms the subject matter of the invention.

What I claim as new and desire to secure by Letters Patent, is:—

1. A cutting device for severing the grain kernels of an ear of corn, including a cutting blade having the advanced portion thereof beveled to form a cutting edge, said beveled portion being provided with grooves in the face thereof extending to the cutting edge and producing piercing points, and cutting edges between said piercing points, said piercing points being disposed in a line oblique to the longitudinal axis of the cutting blade, and said cutting edges being disposed in parallel lines at an angle to said oblique line.

2. A machine for cutting grain kernels from an ear of corn, including ear feeding means and a cutting blade, said blade having the advanced portion thereof beveled to form a cutting edge, said beveled face being provided with grooves extending to the cutting edge and forming means for first piercing and then cutting each severed grain kernel, said grooves in said beveled face lying in planes parallel to the line of feed.

3. A machine for cutting grain kernels from an ear of corn, including an ear feeding means and a cutting blade having a concave cylindrical face along which the ear to be severed passes, said blade having the edge portion of the face away from the ear beveled so as to form a cutting edge, said beveled face being provided with grooves extending to the cutting edge and forming ribs terminating in piercing points at the cutting edge, the face of the rib at one side thereof being shaped so as to produce a cutting edge extending from the piercing points rearwardly away from said piercing points.

4. A machine for cutting grain kernels from an ear of corn, including an ear feeding means and a cutting blade having a concave cylindrical face along which the ear to be severed passes, said blade having the edge portion of the face away from the ear beveled so as to form a cutting edge, said beveled face being provided with grooves extending to the cutting edge and forming ribs terminating in piercing points at the cutting edge, the face of the rib at one side thereof being shaped so as to produce a cutting edge extending from the piercing points rearwardly away from said piercing points, said piercing points being disposed in a line which is oblique to the line of feed.

5. A machine for cutting grain kernels from an ear of corn, including ear feeding means, and a cutting blade having its outer face beveled to form a cutting edge disposed in a line at an acute angle to the line of feed, said beveled face being provided with grooves formed therein producing a serrated cutting edge.

6. A machine for cutting grain kernels from an ear of corn including ear feeding means, a cutting blade having the face thereof adjacent the ear substantially parallel with the line of feed, and the outer face thereof beveled or inclined to form a cutting edge, said beveled face having grooves formed therein providing a serrated cutting edge.

7. A machine for cutting grain kernels from an ear of corn including ear feeding means and a cutting blade having its inner face substantially parallel with the line of feed and its outer face at an angle thereto forming a cutting edge, said outer face having grooves formed therein providing piercing points and cutting edges, the piercing points lying in a line at an acute angle to the line of feed and said cutting edges lying in parallel lines at an acute angle to the line containing the piercing points.

8. A machine for cutting grain kernels from an ear of corn including ear feeding means and a cutting blade, said blade having the outer face thereof uniformly beveled, grooves formed in said beveled face of a uniform depth and forming piercing points and cutting edges, which piercing points are spaced from each other, the inner face of said blade being substantially parallel with the line of feed.

In testimony whereof, I affix my signature.

RALPH COVER.